(12) United States Patent
Chawla et al.

(10) Patent No.: US 12,289,340 B2
(45) Date of Patent: Apr. 29, 2025

(54) SYSTEM AND METHOD FOR THREAT DETECTION THROUGH DATA STORAGE ANALYSIS

(71) Applicant: Dell Products L.P., Round Rock, TX (US)

(72) Inventors: Gaurav Chawla, Austin, TX (US); Boris Glimcher, Tel Aviv-Jaffa (IL); Maunish A. Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 18/048,657

(22) Filed: Oct. 21, 2022

(65) Prior Publication Data

US 2024/0137384 A1    Apr. 25, 2024
US 2024/0236141 A9    Jul. 11, 2024

(51) Int. Cl.
*H04L 9/40*          (2022.01)
*H04L 41/16*       (2022.01)

(52) U.S. Cl.
CPC .......... *H04L 63/1441* (2013.01); *H04L 41/16* (2013.01); *H04L 63/1416* (2013.01)

(58) Field of Classification Search
CPC . H04L 63/1441; H04L 41/16; H04L 63/1416; H04L 63/1425
See application file for complete search history.

(56) References Cited

U.S. PATENT DOCUMENTS

| | | | | |
|---|---|---|---|---|
| 2020/0314123 | A1* | 10/2020 | Staab | G06F 21/554 |
| 2021/0216629 | A1* | 7/2021 | Miller | G06F 21/52 |
| 2021/0216630 | A1* | 7/2021 | Karr | H04L 63/1416 |
| 2021/0216633 | A1* | 7/2021 | Lee | G06F 21/6218 |
| 2021/0216648 | A1* | 7/2021 | Child | G06F 21/604 |
| 2021/0216666 | A1* | 7/2021 | Miller | G06F 12/1408 |
| 2023/0060207 | A1* | 3/2023 | Sirineni | H04L 63/1416 |

* cited by examiner

*Primary Examiner* — Joseph P Hirl
*Assistant Examiner* — Thomas A Gyorfi
(74) *Attorney, Agent, or Firm* — WOMBLE BOND DICKINSON (US) LLP (57) ABSTRACT

Methods and systems for managing data access based threats are disclosed. To manage the data access based threats, a data processing system may include a network interface controller (NIC). The network interface controller may present emulated storages that may be used for data storage. The emulated storage devices may utilize storage resources of storage devices. The NIC may actively screen for access patterns in use of the emulated storage devices that indicate compute complexes may be compromised. When doing so, the processing may be done locally on the NIC.

20 Claims, 4 Drawing Sheets

SYSTEM AND METHOD FOR THREAT DETECTION THROUGH DATA STORAGE ANALYSIS

FIELD OF THE DISCLOSED EMBODIMENTS

Embodiments disclosed herein relate generally to data storage. More particularly, embodiments disclosed herein relate to systems and methods for managing threats presented by stored data.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data access based threats in a distributed system. To manage data access based threats, a data processing system may include a network interface controller (NIC). The NIC may present emulated storages that may be used for data storage. The emulated storage devices may utilize storage resources of storage devices, but form the perspective of compute complexes only the emulated storage may exist.

To manage data access based threats, the NIC may screen for data access patterns in access requests that indicate that compute complexes are likely compromised. The NICs may do so by discriminating atypical access patterns from typical access patterns. Atypical access patterns may be viewed as indicating that compute complexes have been compromised.

When a compute complex is identified as being potentially compromised, the NIC may take proactive action to reduce potential impacts of the potentially compromised compute complex. For example, the NIC may take action to preserve stored data and prevent unauthorized access to stored data.

By doing so, a data processing system in accordance with embodiments disclosed herein may present a lower degree of risk when operated in a distributed environment. Thus, embodiments disclosed herein may, among others, address the technical problem of security in a distributed environment. The disclosed embodiments may address the challenging of security in distributed environments by proactively identifying and remediating data access based threats.

In an embodiment, a computer-implemented method for managing threats to data processing systems comprising compute complexes is disclosed. The method may include monitoring, by a Network Interface Controller (NIC) of a data storage complex, data accesses to identify an access pattern by a compute complex, the data accesses being originated by a compute complex and directed to a storage device used by the NIC to provide data storage services for the compute complex; making, by the NIC and using a local stored data structure, a determination regarding whether the access pattern indicates that the compute complex is potentially compromised; in an instance of the determination where the access pattern indicates that the compute complex is potentially compromised: identifying, by the NIC, a mitigation action to mitigate an impact of a compromise of the compute complex; performing, by the NIC, the mitigation action; obtaining, by the NIC, an anonymized copy of the access pattern; and distributing, by the NIC, the anonymized copy of the access pattern to an analysis entity to ascertain whether the compute complex is compromised.

Making the determination may include ingesting the access pattern into an inference model to obtain an inference regarding whether the access pattern is within historical access patterns of the compute complex, the inference model being obtained from the analysis entity; and basing the determination on the inference.

Identifying the mitigation action may include making a second determination regarding whether the access pattern indicates a write based threat from the potentially compromised compute complex or a read based threat from the potentially compromised compute complex.

Identifying the mitigation action may also include in a first instance of the second determination where the access pattern indicates a write based threat: redirecting writes of the access pattern from corresponding targets to a log storage stored in the storage device to preserve integrity of previously stored data in the targets.

Identifying the mitigation action may also include, in a second instance of the second determination where the access pattern indicates a read based threat: disallowing the reads to be propagated to the corresponding targets to prevent the compute complex from reading the previously stored data in the targets.

Monitoring the data access may include buffering, by the NIC, a portion of the data accesses in a cache of the NIC until a quantity of the data accesses of portion of the data accesses exceed a threshold; and retaining, by the NIC, the portion of the data accesses in the cache until the determination is made.

The computer-implemented method may also include in a second instance of the determination where the access pattern indicates that the compute complex is not potentially compromised: forwarding, by the NIC, the portion of the data accesses in the cache to the storage device.

A non-transitory media may include instructions that when executed by a processor cause the computer-implemented method to be performed.

A data processing system may include the non-transitory media and a processor (e.g., of a NIC), and may perform the computer-implemented method when the computer instructions are executed by the processor.

Figure 1:
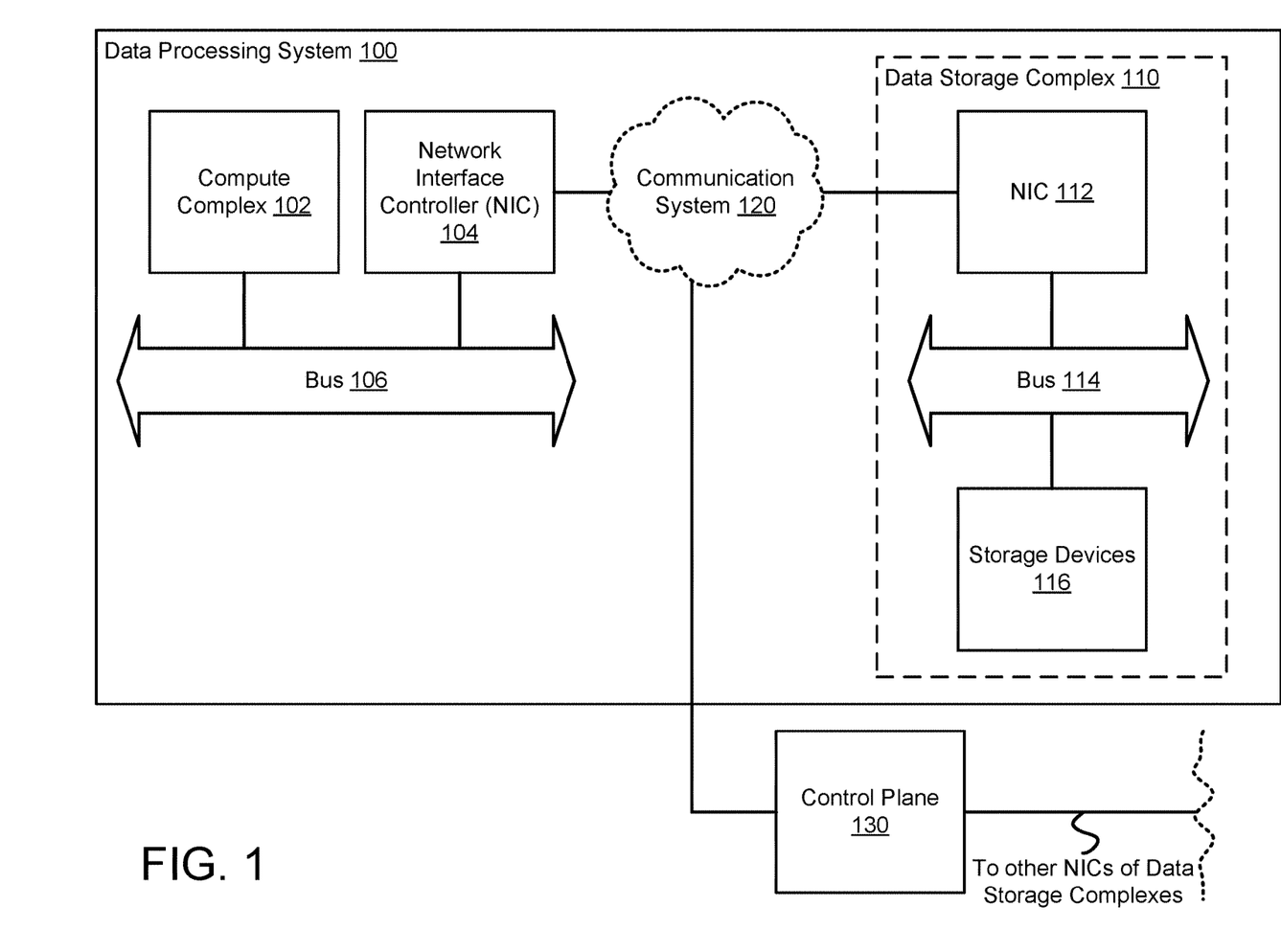
FIG. 1 shows a block diagram illustrating a data processing system in accordance with an embodiment.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different data processing systems may provide similar and/or different computer implemented services.

To provide the computer implemented services, data processing system 100 may include various hardware resources such as compute complex 102, network interface controller (NIC) 104, bus 106, and/or data storage complex 110. Each of these hardware resources is discussed below.

Compute complex 102 may include hardware devices such as processors, memory modules, etc. These hardware devices may support execution of computer code that causes the computer implemented services to be provided. While providing the computer implemented services, data may be stored in memory (e.g., provided by the memory modules) and/or storage (e.g., non-transitory storage). Compute complex 102 may store data in data storage complex 110.

NIC 104 may facilitate communication between compute complex 102 and other devices and/or portions of data processing system. For example, NIC 104 may facilitate communication with data storage complex 110. Bus 106 may operably connect compute complex 102, and/or the portions thereof, with NIC 104.

When providing the computer implemented services, data may be stored for future use in data storage complex 110. To facilitate use of data storage complex 110, NIC 104 and/or NIC 112 may present an emulated storage (e.g., by presenting an emulated storage endpoint) to compute complex 102 via bus 106. The NICs may utilize storage devices 116 to implement the emulated storage (NICs may also be referred to as data processing units, smart NICs, etc.). Consequently, compute complex 102 may direct access requests (e.g., read, write, delete) for the emulated storage to NIC 104 and/or NIC 112 via bus 106. From the perspective of compute complex 102, the emulated storage may be a local device that complies with a bare metal communication scheme implemented with bus 106.

To implement the emulated storage, NICs 104, 112 may use the storage resources of storage devices 116. For example, NICs 104, 112 may include functionality to secure, format, and use storage resources of storage devices 116. When an access request (read, write, delete, etc. request) for the emulated storage is received by NICs 104, 112, translation tables, lookup tables, and/or other mechanisms for servicing the access request may be used to service the access requests (e.g., by writing data to and/or reading data from storage devices 116). However, from the perspective of compute complex 102, the emulated storage may appear to be a bare metal device operably connected to compute complex 102 via bus 106. Compute complex 102 may be unaware of the components of data storage complex 110 and/or the processes performed by NICs 104, 112 to service the access requests.

Bus 114 may operably connect NIC 112 and storage devices 116. Busses 106, 112 may be implemented with communications links that may comply with any communication standard. For example, busses 106, 112 may be implemented with one or more communication links that may conform to a communication specification such as the Peripheral Component Interconnect Express (PCIe) specification, or other types of communication specifications.

While data storage complex 110 is illustrated as part of data processing system 100, it will be appreciated that data storage complex 110 may be separate from data processing system 100 (e.g., different devices). In such scenarios, communication system 120 (drawn with dashed outline to indicate that it may or may not be present, and may be a part of and/or separate from data processing system 100 and/or data storage complex 110. Similarly, while illustrated with two NICs (e.g., 104, 112), it will be appreciated that the functionality of the NICs discussed herein may be implemented into a single device.

Additionally, while illustrated in FIG. 1 with a single compute complex 102, NIC 104, and bus 106, it will be appreciated that a data processing system may include any numbers of these components which may operate independently, and may use data storage complex 110 for data storage purposes.

In general, embodiments disclosed herein relate to systems, methods, and devices for managing data storage based threats in a distributed system. The data storage based threats may originate from compute complex 102.

For example, while operating, compute complex 102 may be compromised by malicious entities (not shown, may be servers or other devices operably connected to compute complex 102). Once compromised, compute complex 102 may originate data access requests for data stored in data storage complex 110. The data access requests may include, for example, (i) writes or deletions that may prevent access to previously stored data (e.g., through encryption, deletion, etc.), and/or (ii) reads that may allow the malicious party to gain access to some of the data in data storage complex 110 that the malicious party would otherwise not be able to access (e.g., copies of the read data may be sent to the malicious party over a network between data processing system 100 and a device controlled by the malicious party).

To manage the data storage based threats, data processing system 100 may implement a distributed threat monitoring and containment system. The distributed threat monitoring and containment system may (i) monitor data access to data storage complex 110 to identify data access patterns, (ii)

identify whether the data access patterns indicate that a compute complex is compromised, and (iii) when a compute complex is compromised, take proactive action to mitigate the impact of data accesses by the compute complex and/or to improve future identification of compromised compute complexes.

The distributed threat monitoring and containment system may be implemented using NICs 104, 112 and/or control plane 130. NICs 104, 112 may monitor and analyze data access patterns by compute complexes using information obtained from control plane 130.

For example, control plane 130 may provide a copy of an inference model (e.g., a trained machine learning model, trained using historical access patterns obtained by the NICs and/or NICs of other data processing systems while compute complexes are not compromised and/or are known to be compromised thereby adapted to ingest access patterns for a compute complex and provide indications regarding the compromise state of a compute complex), a rules set that may be used to discriminate some access patterns (e.g., that do not indicate compromise) from other access patterns (e.g., that do indicate compromise), etc.

The NICs 104, 112 may then take action to mitigate the impact of compute complex 102 being compromised. For example, NICs 104, 112 may, in the event of a write-based attack, redirect the write so that the write does not disrupt future access to stored data. In the event of a read-based attack, the data access requests may not be implemented and from the perspective of the originating compute complex the reads may simply have been dropped in the communication path to the emulated storage. Additionally, information regarding the access patterns may be provided to control plane 130.

Control plane 130 may use the provided access patterns (e.g., and with access patterns from other data storage complexes) to refine and improve detection and remediation of data access based requests. For example, control plane 130 may revise existing information used by the NICs to detect suspect compute complexes, may establish new information usable to detect suspect compute complexes, etc. Once obtained, the new/updated information may be deployed to the NICs.

By doing so, embodiments disclosed herein may provide an improved data processing device that is less susceptible to threats presented by malicious parties in a distributed environment, even while compute complexes of the data processing system area compromised. Thus, embodiments disclosed herein may address, among others, the technical problem of malicious parties in a distributed environment. The disclosed embodiments may address the threats presented by the malicious parties by identifying access patterns indicative of compromise of compute complexes, and taking proactive action to mitigate the impact of compromised compute complexes.

Additionally, the distributed system (e.g., in which data processing system 100 may reside) may have a limited bandwidth for communications between components of the distributed system. By implementing a distributed framework that partially operates locally on data storage complex 110, the quantity of bandwidth used for threat detection may be reduced (e.g., when compared to scenarios in which access patterns are streamed to control plane 130 for analysis). Thus, embodiments disclosed herein may also address, among others, the technical problem of limited communication bandwidth in distributed systems. The disclosed embodiments may address limited availability of communication bandwidth by performing data access pattern analysis locally. Consequently, a reduced quantity of data from various data processing systems may need to be centralized for analysis by a control plane (e.g., in comparison to scenarios in which data access patterns are centralized and then analyzed) thereby improving communication bandwidth availability for other purposes (e.g., such as providing computer implemented services).

NICs 104, 112 may be implemented with a hardware devices and/or software components hosted by the hardware devices. In an embodiment, NICs 104, 112 are implemented using a hardware device including circuitry. The hardware device may be, for example, a digital signal processor, a field programmable gate array, system on a chip, or an application specific integrated circuit. The circuitry may be adapted to cause the hardware device to perform the functionality of NICs 104, 112. NICs 104, 112 may be implemented using other types of hardware devices without departing from embodiments disclosed herein.

In an embodiment, NICs 104, 112 are implemented using a processor adapted to execute computing code stored on a persistent storage that when executed by the processor performs the functionality of any of NICs 104, 112 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiments disclosed herein.

Generally, NICs 104, 112 may include functionality to process network data units such as packets. Packets may be exchanged with communication system 120, and devices operably connected to communication system 120 such as other NICs, control plane 130, and/or other entities (not shown). The communications between NIC 112 and other devices may be encapsulated to obtain packets (or other communication protocol compliant data structures), and may traverse through communication system 120.

NIC 112 may be implemented with and/or perform the functions of various types of devices such as data processing units (e.g., portions of a chip or a system on a chip), infrastructure processing units, smart network interface controllers, etc. These devices may generally be programmable, facilitate communications with other components, include accelerator cores or other components for speeding the performance of certain functions such as cryptography, and/or may generally include configurable units to perform a broad array of functions through configuration.

Bus 106 and/or bus 114 may be implemented with one or more communication buses. The communications buses may support various communications standards. In an embodiment, bus 106 and/or bus 114 comprises a Peripheral Component Interconnect Express (PCIE) bus. Any of the NICs may comply with the Non-Volatile Memory Express (NVMe) specification and support NVME communications. The NICs may also support, NVME over fabric (NVMe-oF) communications (or other communication standards) and may communicate with storage devices 116 and/or other local storage devices (not shown) using NVMe-oF communications.

To support NVMe communications, the NICs 104, 112 may include functionality to present endpoints (e.g., addressable locations presented to other devices), establish initiators to facilitate communications between endpoints and the initiators, and/or implement other methods for communicating via bus 106, bus 114, communication system 120, and/or other communications facilitates not illustrated in FIG. 1.

Figure 2:
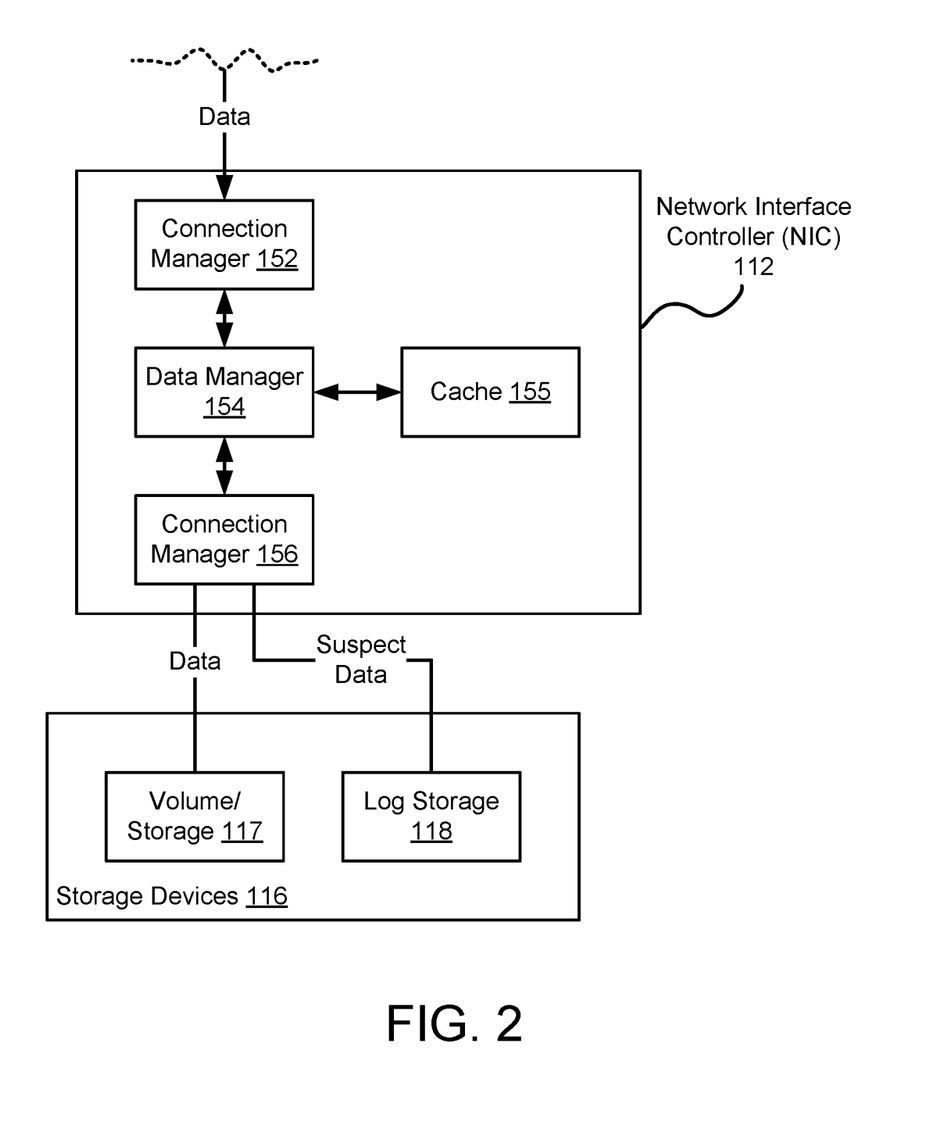
FIG. 2 shows a block diagram illustrating a network interface controller in accordance with an embodiment.

Refer to FIG. 2 for additional details regarding NIC 112.

Storage devices 116 may be implemented using, for example, any number of storage devices such as hard disk drives, solid state drives, etc.

In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 120 may include packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of compute complex 102, NIC 104, NIC 112, and control plane 130 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components without departing from embodiments disclosed herein.

As discussed above, NICs may participate in data access based threat identification and mitigation. Turning to FIG. 2, a diagram of NIC 112 in accordance with an embodiment is shown. To provide its functionality, NIC 112 may communicate with compute complex 102 via bus 106, and may communicate with storage devices 116.

To communicate with NIC 112, compute complex 102 may a host connection manager (e.g., which may be a portion of NIC 104). The connection manager may generate access requests (e.g., data read, data write, data deletion, etc.) based on requests from applications hosted by compute complex 102, encapsulate the access requests as necessary to comply with the communication scheme supported by bus 106, and transmit the encapsulated access request to an emulated storage device endpoint presented by NIC 104 (which may be in communication with NIC 104). In the context of data storage, the access request may include the data (e.g., being obtained by connection manager 152 in FIG. 2) to be stored in the emulated storage.

The connection manager used by compute complex 102, in the context of NVMe communications, may be implemented with an NVMe initiator. The NVMe initiator may be implemented with a driver or other piece of software for sending communications via bus 106. The applications and the connection manager may execute via compute complex 102 and/or NIC 104.

While not shown in FIGS. 1-2, compute complex 102 may host an operating system, abstraction layers such as virtualization or drivers, and/or other components (e.g., any of which may include the connection manager) that mediates presentation of storage to the applications. Connection manager may be implemented differently to conform to different type of communications without departing from embodiments disclosed herein. The applications may provide (all or a portion) the computer-implemented services provided by a data processing system.

To present the emulated storage device endpoint to compute complex 102, NIC 112 may host connection manager 152. Connection manager 152 may present emulated storage device endpoints to other devices, or portions thereof, such as compute complex 102. Connection manager 152 may present any number of such emulated endpoints. By doing so, NIC 112 may present any number of emulated storage devices to compute complex 102 and thereby allow for data from compute complex 102 to be transmitted to NIC 112, which may in turn store the data in storage devices 116, monitor for malicious activity, and take action in the event that malicious activity is identified.

When communications are received by connection manager 152, the connection manager may identify a target emulated storage and initiate processing of the access requests based on the target. For example, connection manager 152 may pass the access requests to data manager 154 which may handle processing of the access requests. The access requests may be processed by (i) placing them in a queue hosted by cache 155 to identify access patterns (e.g., aggregating a sufficient number of reads/writes/deletions to establish an identifiable pattern), (ii) determining whether the access patterns indicate malicious activity, and (iii) when no indicate of malicious activity, the accesses may be released from the queue in cache 155 and propagated to the volume/storage (e.g., 117) to which they are directed toward. However, if malicious activity is identified, then the access requests may be redirected to log storage 118. Log storage 118 may log the access requests (e.g., to establish an access pattern) and store metadata regarding the access requests. Consequently, the data in volume/storage 117 may not be impacted by accesses that may be malicious in nature, while retaining the ability to use the accesses in case they are found to, in fact, not be malicious. Data manager 154 may also initiating various alerting and/or send various notifications (e.g., to users of a host data processing system, to an administrator, etc.) in the event that malicious activity is identified to draw attention to the malicious activity.

To identify access request patterns that may be malicious, NIC 112 may store information obtained from the control plane that facilitates discrimination of access patterns that are similar to those typically employed by a compute complex from those that may be malicious. For example, the control plane may provide an inference model, a set of rules, and/or other information. The information may be used (e.g., by ingesting an access pattern into the inference model, by applying the set of rules to the access pattern, etc.) to identify whether an access pattern is similar to historic access patterns or different. If different, then the access pattern may be treated as being malicious.

To service the accesses, data manager 154 may provide these access requests to connection manager 156. Connection manager 156 may facilitate communications with storage devices 116. Storage devices 116 may include any type and quantity of storage devices for storing data.

Connection manager 156 may be implemented with, for example, a PCIe initiator, NVMe-oF initiator, and/or other communication protocol compliant initiators to facilitate communications between NIC 112 and storage devices 116 and/or other devices. Any of connection manager 152 and connection manager 156 may be implemented with, for example, a driver or other type of application.

In an embodiment, any of connection manager 152, data manager 154, and connection manager 156 is implemented using a hardware device including circuitry. The hardware device may be, for example, a digital signal processor, a field programmable gate array, system on a chip, or an application specific integrated circuit. The circuitry may be adapted to cause the hardware device to perform the functionality of connection manager 152, data manager 154, and/or connection manager 156. Connection manager 152, data manager 154, and/or connection manager 156 may be implemented using other types of hardware devices without departing embodiment disclosed herein.

In an embodiment, any of connection manager 152, data manager 154, and connection manager 156 is implemented using a processor adapted to execute computing code stored on a persistent storage that when executed by the processor performs the functionality of connection manager 152, data manager 154, and/or connection manager 156 discussed throughout this application. The processor may be a hardware processor including circuitry such as, for example, a central processing unit, a processing core, or a microcontroller. The processor may be other types of hardware devices for processing information without departing embodiment disclosed herein.

Connection manager 152, data manager 154, and/or connection manager 156 may perform all, or a portion, of the methods illustrated in FIGS. 3A-3C.

Cache 155 may be implemented using memory of NIC 112.

Volume/storage 117 may be implemented with one or more data structures that include any groupings of storage resources of storage devices 116 to which data may be stored. The groupings may store data for various compute complex which a data storage complex services.

Log storage 118 may be implemented with one or more data structures that store logs of access requests that are suspected of being malicious in nature. When malicious access requests are obtained, the compute complex that originated the access requests may be potentially compromised. As will be discussed below, NIC 112 may not be able to make a final determination regarding whether access requests are malicious. Rather, NIC 112 may attempt to screen for access requests that may be malicious, and may submit the access requests to a control plane for additional analysis while also taking proactive action to mitigate the impact of a compute complex that is compromised.

While illustrated in FIG. 2 with a limited number of specific components, a NIC may include additional, fewer, and/or different components without departing from embodiments disclosed herein.

Figure 3:
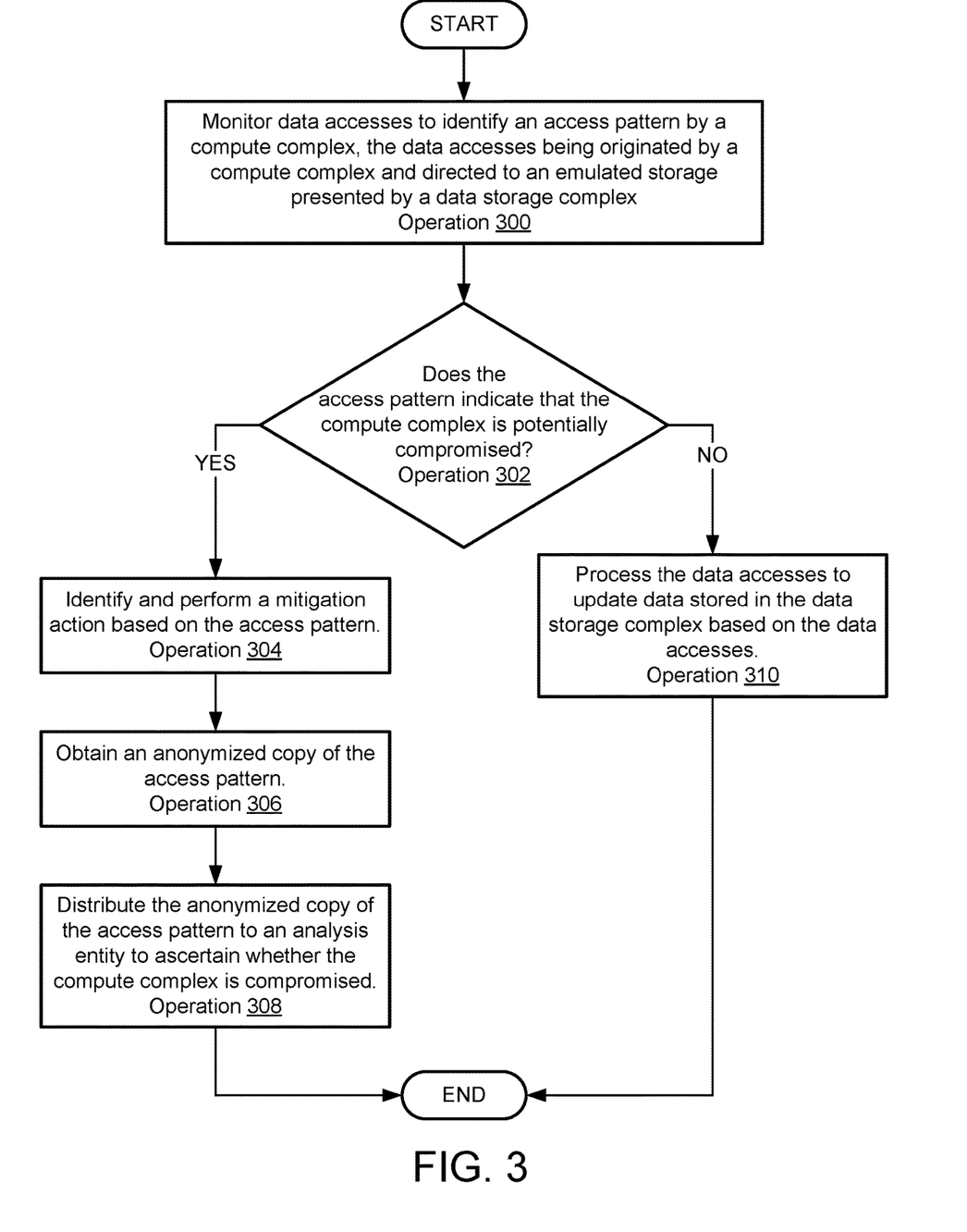
FIG. 3 shows a flow diagram illustrating a method of managing threats to data processing systems in accordance with an embodiment.

As discussed above, the components of FIG. 1 may perform various methods to identify and mitigate data access based threats. FIG. 3 illustrates examples of methods that may be performed by the components of FIG. 1 when providing their functionalities. In the diagrams discussed below and shown in FIG. 3, any of the operations may be repeated, performed in different orders, and/or performed in a parallel with other operations and/or a partially overlapping in time manner with other operations.

Turning to FIG. 3, a flow diagram illustrating a method of mitigating data access based threats in accordance with an embodiment is shown. The method may be performed by a NIC, a data processing system, a data storage complex, and/or other components of FIG. 1.

Prior to operation 300, a NIC of a data storage system may provide example access patterns of a compute complex. The example access patterns may be known to be from the compute complex while the compute complex is not compromised. The access patterns may be used to obtain (in isolation and/or with access patterns of other compute complexes) an inference model, establish a set of rules, and/or otherwise obtain information usable to discriminate typical from atypical data access patterns for the compute complex.

The analysis entity (e.g., a control plane) may deploy the information to one or more NICs of data storage complexes. Once deployed, the data storage complexes may use the information to discriminate access patterns that may be malicious in nature.

At operation 300, data accesses by a compute complex are monitored to identify an access pattern. The data access may be monitored by (i) caching the data accesses until a predetermined quantity (e.g., above a threshold) are obtained to establish an access pattern, and (ii) delaying further processing of the data accesses in the cache. In other words, when the data access are received, the data accesses may be stored and not forwarded to a storage device for implementation.

At operation 302, a determination is made regarding whether the access pattern indicates that the compute complex is potentially compromised. The determination may be made by (i) comparing the access pattern to example access patterns that are typical and/or atypical for the compute complex, with atypical access patterns indicating that the compute complex may be compromised, (ii) ingesting the access pattern into a trained inference model which may be trained to output indications regarding whether an access pattern is typical or atypical, (iii) running a set of rules on the access pattern to make the determination, an outcome of the set of rules identifying whether the access pattern is typical or atypical, and/or (iv) via other processes. The example access patterns, inference model, and/or set of rules may be obtained from the analysis entity. Any of the access patterns, inference model, and/or set of rules may be based on access patterns originated any number of compute complexes.

If it is determined that the access pattern indicates that the compute complex is potentially compromised, then the method may proceed to operation 304. Proceeding to operation 304 may indicate that the compute complex may be compromised, but additional analysis by the analysis entity may need to be performed to conclude one way or the other.

If it is determined that the access pattern does not indicate that the compute complex is potentially compromised, then the method may proceed to operation 310.

At operation 304, a mitigation action is identified based on the access pattern. The identified mitigation action may be performed.

The mitigation action may be identified by identifying a type of threat presented by the access pattern. If the threat may remove access to stored data (e.g., the access pattern includes writes/deletions that may overwrite/delete data), then the type of threat may be identified as a write-based threat. If the threat may provide access to the stored data to an unauthorized party (e.g., the access pattern includes reads which if executed may give the potentially compromised compute complex access to it), then the type of threat may be identified as a read-based threat.

Write and read based threats may be associated with corresponding mitigation actions. Accordingly, the associations may be used to identify the mitigation action based on the type of the threat.

The mitigation actions associated with write-based threats may include (i) redirecting the writes/deletions to a log storage rather than to the location in which data is stored in the storage devices, (ii) sending notifications and/or alerts (e.g., to users and/or administrators of the compute complex), and/or (iii) other types of actions that may reduce an impact of write-based threats.

The mitigation actions associated with read-based threats may include (i) blocking accesses by the compute complex that originated the read-based threats, (ii) sending notifications (to indicate that an access pattern has changed) and/or alerts (e.g., to users and/or administrators of the compute complex, to indicate that there is some risk that the compute complex is compromised), and/or (iii) other types of actions that may reduce an impact of read-based threats.

The actions associated with these threat types may be stored in a policy library. The policy library may be updated over time by the analysis entity and/or other entities. The policy library may specify the mitigation actions, when may be keyed to the types of the threats to which the mitigations actions are applicable.

Blocking the accesses may appear, to the compute complex, as is the data units (e.g., packets or other structures in which the access requests were transmitted across communication infrastructure) in which the access requests were sent were not received by the emulated storage. Consequently, the compute complex may not need to take any special action, and may respond similarly to any scenario in which some data unit lost has occurred (e.g., which may trigger retransmission by the compute complex or other types of responses).

At operation 306, an anonymized copy of the access pattern is obtained. The anonymized access may be obtained by removing identifiable information from the data stored in the log storage. For example, names, locations, and/or other types of identifying information may be removed and/or replaced with placeholders (e.g., "*****" where the "*" indicates replacement of a character deemed to convey some identifying information). Other types of information (e.g., financial information, dates, etc.) may also be removed from the information included in the log storage to obtain the anonymized copy of the access pattern.

At operation 308, the anonymized copy of the access pattern is distributed to an analysis entity to ascertain whether the compute complex is compromised. The access pattern may be distributed by (i) sending a copy of the access pattern to the analysis entity via one or more messages, (ii) storing the copy of the access pattern in a specific location (e.g., known and/or monitored by the analysis entity, and/or (iii) via other processes.

The analysis entity, as noted above, may be a control plane and may implement algorithms for further analysis of the access pattern. The analysis entity may make the determination regarding whether the compute complex (suspected of being compromised) is compromised.

The method may end following operation 308.

Following operation 308, a NIC performing operations 304, 306, and 308, may receive information indicating whether the compute complex is compromised based on the access pattern. If compromised, then various entities may be notified and various remediation workflows may be initiated.

Returning to operation 302, the method may proceed to operation 310 following operation 302 when it is determined that the access pattern indicates that the compute complex is not potentially compromised.

At operation 310, the data accesses are processed to update data stored in the data storage complex based on the data accesses. The data accesses may be processed by (i) identifying destination blocks, storage devices in which the blocks are stored, etc., and (ii) forwarding the data accesses based on the identified information. By doing so, the reads/writes/deletions indicated by the data accesses may be implemented to complete storage of data from a compute complex in a data storage complex.

The method may end following operation 310.

Using the method illustrated in FIG. 3, embodiments disclosed herein may reduce the likelihood that data stored in a data processing system is impacted by data access based threats. For example, NICs used to manage data storage may operate independently (e.g., may be physically air gapped from the host data processing system) and transparently from compute complexes of host data processing systems. Consequently, compromise of a compute complex may not impede the data processing system from identifying the data access based threats, and remediating the threats.

Figure 4:
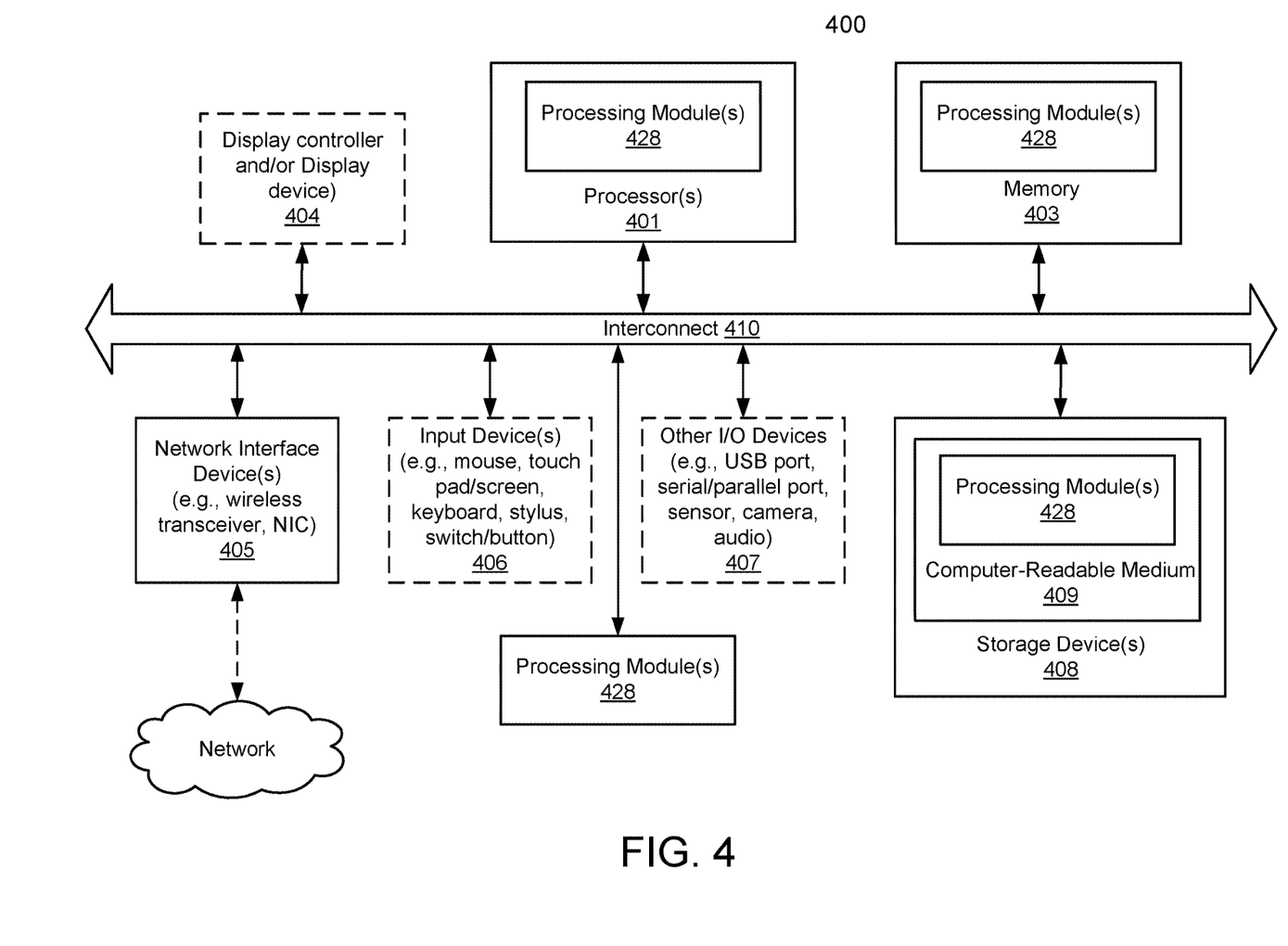
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing threats to data processing systems comprising compute complexes, the method comprising:
   monitoring, by a Network Interface Controller (NIC) of a data storage complex that provides a compute complex of the compute complexes with emulated access to a portion of storage resources of the data storage complex, data accesses of the portion of the storage resources by the compute complex to identify an access pattern by the compute complex, wherein the data accesses originate from the compute complex and are directed to a storage device of the data storage complex used by the NIC to provide data storage services for the compute complex;
   making, by the NIC, a determination regarding whether the access pattern indicates that the compute complex is potentially compromised;
   in an instance of the determination where the access pattern indicates that the compute complex is potentially compromised:
      identifying, by the NIC, a mitigation action to mitigate an impact of a compromise of the compute complex;
      performing, by the NIC, the mitigation action, wherein the storage device comprises a first storage and a second storage and performing the mitigation action comprises prohibiting access to the first storage while redirecting all of the data accesses received after determining that the compute complex is potentially compromised solely to the second storage;
      obtaining, by the NIC, an anonymized copy of the access pattern; and
      distributing, by the NIC, the anonymized copy of the access pattern to an analysis entity to ascertain whether the compute complex is compromised.

2. The computer-implemented method of claim 1, wherein making the determination comprises:
   ingesting the access pattern into an inference model to obtain an inference regarding whether the access pattern is within historical access patterns of the compute complex, the inference model being obtained from the analysis entity; and
   basing the determination on the inference.

3. The computer-implemented method of claim 2, wherein identifying the mitigation action comprises:
   making a second determination regarding whether the access pattern indicates a write based threat from the potentially compromised compute complex or a read based threat from the potentially compromised compute complex.

4. The computer-implemented method of claim 3, wherein identifying the mitigation action further comprises:
   in a first instance of the second determination where the access pattern indicates a write based threat:
      redirecting writes of the access pattern from corresponding targets within the first storage to the second storage while redirecting the writes to the second storage to preserve integrity of previously stored data in the targets of the first storage, the second storage being a log storage configured to store only logs of the data accesses and metadata of the data accesses.

5. The computer-implemented method of claim 4, wherein identifying the mitigation action further comprises:
   in a second instance of the second determination where the access pattern indicates a read based threat:
      disallowing the reads to be propagated to the corresponding targets within the first storage while redirecting the reads to the second storage to prevent the compute complex from reading the previously stored data in the targets within the first storage.

6. The computer-implemented method of claim 1, wherein monitoring the data access comprises:
   buffering, by the NIC, a portion of the data accesses in a cache of the NIC until a quantity of the data accesses of portion of the data accesses exceed a threshold; and
   retaining, by the NIC, the portion of the data accesses in the cache until the determination is made.

7. The computer-implemented method of claim 1, wherein the NIC supports Non-Volatile Memory Express (NVMe) based communications.

8. The computer-implemented method of claim 1, wherein
   the NIC of the data storage complex is a first NIC that is different from a second NIC of the compute complex, and
   the second NIC facilitates for the compute complex, communications between the compute complex and the first NIC.

9. The computer-implemented method of claim 8, wherein the second NIC and the first NIC cooperatively provide the compute complex with the emulated access to the portion of storage resources of the data storage complex.

10. The computer-implemented method of claim 1, wherein the second storage is a log storage that is configured to store only logs of the data accesses and metadata of the data accesses.

11. The computer-implemented method of claim 10, wherein the method further comprises, by the NIC:
    obtaining an indication from the analysis entity that the compute complex is not actually compromised;
    determining, based on the indication, that the data accesses received between the determining that the compute complex is potentially compromised and the obtaining of the indication are non-compromised data accesses; and
    directing the non-compromised data accesses to the first storage; and
    fulfilling, using the first storage, the non-compromised data accesses based on the logs and the metadata of the non-compromised data accesses stored in the second storage.

12. A non-transitory machine-readable medium having instructions stored therein, which when executed by a processor, cause the processor to perform operations for managing threats to data processing systems comprising compute complexes, the operations comprising:
    monitoring, by a Network Interface Controller (NIC) of a data storage complex that provides a compute complex of the compute complexes with emulated access to a portion of storage resources of the data storage complex, data accesses of the portion of the storage resources by the compute complex to identify an access pattern by a compute complex, wherein the data accesses originate from the compute complex and are directed to a storage device of the data storage complex used by the NIC to provide data storage services for the compute complex;
    making, by the NIC, a determination regarding whether the access pattern indicates that the compute complex is potentially compromised;
    in an instance of the determination where the access pattern indicates that the compute complex is potentially compromised:
       identifying, by the NIC, a mitigation action to mitigate an impact of a compromise of the compute complex;
       performing, by the NIC, the mitigation action, wherein the storage device comprises a first storage and a second storage and performing the mitigation action comprises prohibiting access to the first storage while redirecting all of the data accesses received after determining that the compute complex is potentially compromised solely to the second storage;
       obtaining, by the NIC, an anonymized copy of the access pattern; and
       distributing, by the NIC, the anonymized copy of the access pattern to an analysis entity to ascertain whether the compute complex is compromised.

13. The non-transitory machine-readable medium of claim 12, wherein making the determination comprises:
    ingesting the access pattern into an inference model to obtain an inference regarding whether the access pattern is within historical access patterns of the compute complex, the inference model being obtained from the analysis entity; and
    basing the determination on the inference.

14. The non-transitory machine-readable medium of claim 13, wherein identifying the mitigation action comprises:
    making a second determination regarding whether the access pattern indicates a write based threat from the potentially compromised compute complex or a read based threat from the potentially compromised compute complex.

15. The non-transitory machine-readable medium of claim 14, wherein identifying the mitigation action further comprises:
    in a first instance of the second determination where the access pattern indicates a write based threat:
       redirecting writes of the access pattern from corresponding targets within the first storage to the second storage while redirecting the writes to the second storage to preserve integrity of previously stored data in the targets of the first storage, the second storage being a log storage configured to store only logs of the data accesses and metadata of the data accesses.

16. A data processing system, comprising:
    a compute complex;
    a data storage complex; and
    a Network Interface controller (NIC), comprising:
       a processor, and
       a memory coupled to the processor to store instructions, which when executed by the processor, cause the processor to perform operations for managing threats to data processing systems, the operations comprising:
          monitoring data accesses of a portion of storage resources of the data storage complex by the compute complex to identify an access pattern by the compute complex, wherein the data accesses from the compute complex and are directed to a storage device of the data storage complex used by the NIC to provide data storage services for the compute complex, the NIC provides the compute complex of the compute complexes with emulated access to the portion of storage resources of the data storage complex;
          making a determination regarding whether the access pattern indicates that the compute complex is potentially compromised;

in an instance of the determination where the access pattern indicates that the compute complex is potentially compromised:
  identifying a mitigation action to mitigate an impact of a compromise of the compute complex;
  performing the mitigation action, wherein the storage device comprises a first storage and a second storage and performing the mitigation action comprises prohibiting access to the first storage while redirecting all of the data accesses received after determining that the compute complex is potentially compromised solely to the second storage;
  obtaining an anonymized copy of the access pattern; and
  distributing the anonymized copy of the access pattern to an analysis entity to ascertain whether the compute complex is compromised.

17. The data processing system of claim 16, wherein making the determination comprises:
  ingesting the access pattern into an inference model to obtain an inference regarding whether the access pattern is within historical access patterns of the compute complex, the inference model being obtained from the analysis entity; and
  basing the determination on the inference.

18. The data processing system of claim 17, wherein identifying the mitigation action comprises:
  making a second determination regarding whether the access pattern indicates a write based threat from the potentially compromised compute complex or a read based threat from the potentially compromised compute complex.

19. The data processing system of claim 18, wherein identifying the mitigation action further comprises:
  in a first instance of the second determination where the access pattern indicates a write based threat:
    redirecting writes of the access pattern from corresponding targets within the first storage to the second storage while redirecting the writes to the second storage to preserve integrity of previously stored data in the targets of the first storage, the second storage being a log storage configured to store only logs of the data accesses and metadata of the data accesses.

20. The data processing system of claim 19, wherein identifying the mitigation action further comprises:
  in a second instance of the second determination where the access pattern indicates a read based threat:
    disallowing the reads to be propagated to the corresponding targets within the first storage while redirecting the reads to the second storage to prevent the compute complex from reading the previously stored data in the targets within the first storage.

* * * * *